2,906,714
Patented Sept. 29, 1959

2,906,714
CERIC COMPLEX OXIDATIVE ION-EXCHANGE RESINS AND THEIR PREPARATION

Norman W. Frisch, Levittown, and Albert F. Preuss, Jr., Hatboro, Pa., assignors to Rohm & Haas Company, Philadelphia, Pa., a corporation of Delaware No Drawing. Application September 29, 1955
Serial No. 537,558

5 Claims. (Cl. 260—2.1)

This invention relates to oxidative resins and to their preparation. It relates to resins which are oxidative in the sense that they are capable of oxidizing materials which are brought in contact with them. It relates to anion-exchange resins on which is adsorbed an anionic ceric acid complex.

The products of this invention are solid oxidizing agents; and, as such, they are effective where a liquid oxidizing agent or a solution of an oxidizing agent is undesirable. Furthermore, they can be used to advantage in the oxidation of dissolved organic compounds which occur in natural surface-waters and which cause fouling and subsequent loss of capacity of the conventional ion-exchange resins which are used in the deionization of such waters.

The products are made by bringing an acidic solution of an anionic ceric sulfate or nitrate complex in contact with particles of an anion-exchange resin. This can be done by soaking or agitating the particles of the anion-exchange resin in a solution of an acidic ceric sulfate or nitrate complex and thereafter separating the particles of resin on which the anionic ceric sulfate or nitrate complex is adsorbed. Alternatively an acidic solution of the ceric sulfate or nitrate complex is passed through a column of particles of resin in the same way that aqueous solutions are treated by the conventional columnar technique.

The anion-exchange resins, which are thus converted into oxidative materials, can be of the weakly basic or strongly basic types. Many of these resins are available commercially and they are described and discussed in U.S. Patents 2,106,486; 2,151,883; 2,223,930; 2,251,234; 2,259,169; 2,285,750; 2,341,907; 2,354,671; 2,354,672; 2,356,151; 2,366,008; 2,388,235; 2,402,384; 2,591,574; 2,591,573; 2,614,099; and 2,540,985, to which reference is made. It is much preferred to employ strongly basic anion-exchange resins which contain, as their functional anion-adsorbing groups, quaternary ammonium groups, such as the resins described in the last three patents listed above. The type which is most satisfactory is that which contains only hydrocarbon substituents on the nitrogen atoms in the quaternary ammonium groups. This last type is exemplified by the resin which is made by the reaction of a tertiary amine, such as trimethylamine, with a chloromethylated cross-linked copolymer of a monovinyl hydrocarbon, such as styrene, and a polyvinyl hydrocarbon, such as divinylbenzene. This preference results from the fact that the ceric complex does tend to oxidize the resin itself. As is well known, those resins which are free of readily oxidizable substituents are the most stable. In other words, the anion-exchange resins which are employed should be relatively impervious to oxidative attack by ceric complexes, particularly the anionic ceric sulfate complex or the anionic ceric nitrate complex which is adsorbed on an ion-exchange resin in accordance with the present invention.

In the preferred embodiment of this invention, the ion-exchange resin is in the salt form—preferably in sulfate or nitrate form. The resin is readily converted to the salt form by treatment with either sulfuric or nitric acid.

For the sake of efficiency and speed of oxidation by the finished product, it is recommended that very small particles of porous resin be employed. Resin particles which are of such a size as to pass through a U.S. standard sieve No. 50 are much preferred.

For most applications, the resin is saturated with a solution of the anionic ceric sulfate or nitrate complex. That is, the ceric complex is adsorbed to the full extent of the capacity of the resin in order to provide the greatest amount of oxidation. In some cases, however, less than the maximum amount of the ceric sulfate complex can be adsorbed, in which case the resin retains anion-adsorbing properties in addition to its acquired oxidative properties.

The solution of ceric sulfate or nitrate complex is acidic. It has a pH below 5.0 and preferably from about 0.5 to 2. Sulfuric or nitric acid is used to impart acidity—sulfuric in conjunction with ceric sulfate and nitric acid in conjunction with ceric nitrate. In the presence of the acid, an anionic ceric sulfate or nitrate complex is formed which is strongly adsorbed by the anion-exchange resin. Although the exact compositions of the complexes of ceric sulfate and nitrate are not established, they are known to be anionic. The formation of the sulfate complex, for purposes of illustration and not limitation, can be represented as follows:

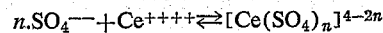
$$n.SO_4^{--} + Ce^{++++} \rightleftarrows [Ce(SO_4)_n]^{4-2n}$$

In the above expression $n$ must be an integer which is 3 or more. When $n$ is 3 or higher the complex can only be anionic; when it is less than 3 it cannot be anionic. The nitrate complex may be formed in a similar fashion; it may be represented correspondingly as follows:

$$[Ce(NO_3)_n]^{4-n}$$

where $n$ is at least 5, the minimum number which will make this complex anionic.

It is the combination of the anionic complex and the insoluble anion-exchange resin which provides the chemical properties—that is, the oxidative and anion-exchange properties—on the one hand and the solid, durable physical qualities on the other.

The following example serves to illustrate the preparation of typical oxidative ion-exchange resins:

Example I

The ion-exchange resin employed was a commercially available strongly basic, quaternary ammonium anion-exchange resin, known to have been made by the reaction of trimethylamine with a chlorimethylated, cross-linked copolymer of 92% styrene and 8% of a commercial grade of divinylbenzene. The resin was sieved and only that portion passing through a U.S. standard sieve No. 50 was employed. This resin was in the chloride form and was wet with water. It was converted to the sulfate by treatment with 5% sulfuric acid.

The resin was supported in a glass tube and through the bed or column of resin was slowly passed an aqueous solution containing 26.4 grams of the ceric salt, tetra-sulfato-ceric acid of the composition $Ce(HSO_4)_4$, and 50 ml. of 96% sulfuric acid per liter of solution. The resin was rinsed with deionized water and was maintained in the moist condition. This product when tested with a ferrous sulfate solution was found to have an oxidizing capacity of 0.42 milliequivalent per gram (dry).

This resin with its adsorbed ceric sulfate complex was compared with the same anion-exchange resin in the sulfate form without the ceric complex. The former was found to have approximately 50% greater capacity for removing color-bodies from a solution of raw sugar than the untreated resin.

Example II

In a similar manner a portion of the same quaternary ammonium anion-exchange resin was treated with an 8-molar solution of nitric acid containing 27.4 grams of ammonium hexanitro cerate (IV), $(NH_4)_2Ce(NO_3)_6$, per liter. The product had an oxidative capacity of .213 milliequivalent per gram (moist).

Similarly an oxidative resin was prepared by treating, with the same solution of the ceric nitrate complex, a weakly basic anion-exchange resin known to have been made by reactiong dimethylamine with particles of a chloromethylated cross-linked copolymer of 92% styrene and 8% divinylbenzene of the commercial grade. This product had an oxidative capacity of .203 milliequivalent per gram (moist).

We claim:

1. An oxidative resin which comprises particles of an amino anion-exchange resin made up of a cross-linked copolymer of a monovinyl and a divinyl hydrocarbon which copolymer is relatively impervious to attack by ceric sulfate and ceric nitrate complexes, and in which the functional ion-exchange groups are amino, said particles having chemically adsorbed on the ion-exchange sites both within and on the surface of the resin by means of an ion-exchange mechanism a ceric acid complex from the group consisting of anionic ceric sulfate complex and anionic ceric nitrate complex, the ceric sulfate complex having the structure $$[Ce(SO_4)_n]^{4-2n}$$

where $n$ is at least 3, and the ceric nitrate complex having the structure $$[Ce(NO_3)_n]^{4-n}$$

where $n$ is at least 5.

2. An oxidative resin which comprises particles of a strongly basic quaternary ammonium anion-exchange resin made up of a cross-linked copolymer of a monovinyl and a divinyl hydrocarbon which is relatively impervious to attack by ceric sulfate and ceric nitrate complexes, said particles having chemically adsorbed on the ion-exchange sites both within and on the surface of the resin by means of an ion-exchange mechanism a ceric acid complex from the group consisting of anionic ceric sulfate complex and anionic ceric nitrate complex, the ceric sulfate complex having the structure $$[Ce(SO_4)_n]^{4-2n}$$

where $n$ is at least 3, and the ceric nitrate complex having the structure $$[Ce(NO_3)_n]^{4-n}$$

where $n$ is at least 5.

3. An oxidative resin which comprises particles of a strongly basic anion-exchange resin obtained by aminating with trimethylamine a chloromethylated cross-linked copolymer of styrene and divinylbenzene, said particles having chemically adsorbed on the ion-exchange sites both within and on the surface of the resin by means of an ion-exchange mechanism a ceric sulfate complex having the structure $$[Ce(SO_4)_n]^{4-2n}$$

where $n$ is at least 3.

4. An oxidative resin which comprises particles of a strongly basic anion-exchange resin obtained by aminating with trimethylamine a chloromethylated cross-linked copolymer of styrene and divinylbenzene, said particles having chemically adsorbed on the ion-exchange sites both within and on the surface of the resin by means of an ion-exchange mechanism a ceric nitrate complex having the structure $$[Ce(NO_3)_n]^{4-n}$$

where $n$ is at least 5.

5. A process for preparing an oxidative resin which comprises bringing into contact with an aqueous solution which has a pH below 5.0 and which contains an anionic ceric complex, from the class consisting of anionic ceric sulfate complex and anionic ceric nitrate complex, particles, of an amino anion-exchange resin made up of a cross-linked copolymer of a monovinyl and a divinyl hydrocarbon, of the category which is relatively impervious to attack by ceric sulfate and ceric nitrate complexes, and in which the functional ion-exchange groups are amino, said particles having chemically adsorbed on the ion-exchange sites both within and on the surface of the resin by means of an ion-exchange mechanism and ceric acid complex from the group consisting of anionic ceric sulfate complex and anionic ceric nitrate complex, the ceric sulfate complex having the structure $$[Ce(SO_4)_n]^{4-2n}$$

where $n$ is at least 3, and the ceric nitrate complex having the structure $$[Ce(NO_3)_n]^{4-n}$$

where $n$ is at least 5.

References Cited in the file of this patent

UNITED STATES PATENTS 2,700,029     Cassidy _____ Jan. 18, 1955

OTHER REFERENCES

Tomkins et al.: Journal American Chemistry Society, vol. 69, November 1947, pp. 2769–2772. (Copy in Sci. Lib.)

Cassidy: Proc. National Acad. Sci., vol. 38, 1952, pp. 934–37. (Copy in Sci. Lib.)

Samuelson: "Ion Exchangers in Analytical Chemistry," 1953, John Wiley and Sons. (Copy in Sci. Lib.) Pages 248–250.